United States Patent [19]
Lyon et al.

[11] Patent Number: 5,127,498
[45] Date of Patent: Jul. 7, 1992

[54] IMPEDANCE MATCHES MASS DAMPER

[75] Inventors: Richard H. Lyon, Belmont; Craig Gardner, Danvers, both of Mass.

[73] Assignee: Massachusetts Institute of Technology, Cambridge, Mass.

[21] Appl. No.: 465,034

[22] Filed: Jan. 16, 1990

[51] Int. Cl.[5] .............................. F16F 9/30
[52] U.S. Cl. .................... 188/379; 188/268
[58] Field of Search .............. 188/268, 269, 378-380; 384/99, 36; 248/550

[56] References Cited

U.S. PATENT DOCUMENTS

| | | | |
|---|---|---|---|
| 2,514,138 | 7/1950 | O'Connor | 188/379 |
| 3,121,395 | 2/1964 | Bodine | 103/76 |
| 3,733,834 | 5/1973 | Ludwig | 61/46 |
| 3,856,267 | 12/1974 | Flannelly | 254/183 |
| 4,254,849 | 3/1981 | Pohlenz | 188/275 |
| 4,420,371 | 12/1983 | Dahl et al. | 162/272 |
| 4,432,254 | 2/1984 | Schultz | 188/379 X |
| 4,590,964 | 5/1986 | Beardmore | 137/565 |
| 4,807,840 | 2/1989 | Baker et al. | 248/559 |
| 4,812,935 | 3/1989 | Sleger | 360/106 |
| 4,924,976 | 5/1990 | Bernett | 188/378 |

FOREIGN PATENT DOCUMENTS

| | | | |
|---|---|---|---|
| 1261192 | 4/1961 | France | 188/379 |
| 920586 | 3/1963 | United Kingdom | 188/379 |
| 1591096 | 6/1981 | United Kingdom | |

Primary Examiner—Robert J. Oberleitner
Assistant Examiner—Alfred Muratori
Attorney, Agent, or Firm—Fish & Richardson

[57] ABSTRACT

Damping structural vibrations by applying a multiplicity of discrete untuned passive dampers to a structure. Each passive damper includes a damping element and a damping mass, and the damping element provides damping generally in proportion to the relative velocity occurring between the mass and a point of attachment of the damper to the structure. The damping coefficients of the damping elements are selected so that the dampers increase the effective loss factor of the structure. The passive dampers each have a damping mass which is supported such that the dampers experience an undamped natural frequency below the resonant frequencies and the frequency range of the structure.

16 Claims, 7 Drawing Sheets $h \geq e$

IMPEDANCE MATCHES MASS DAMPER

BACKGROUND OF THE INVENTION

This invention relates to devices designed to damp vibrations on large stiff structures.

One such structure is marine propulsion equipment which typically includes a steel subbase supporting turbines and a gearbox. In a modern subbase design, "cutouts" have been made to lower the weight. Unfortunately, the lighter design is conducive to increased vibrational levels and provides less surface area to apply damping treatments.

Prior art includes both tuned and untuned dampers. Tuned dampers have a natural frequency matched to the frequency of the vibrating structure. These devices are frequency specific, must be "retuned," and do not provide the needed vibration reduction over a broad frequency range.

Untuned dampers have a broad band or frequency independent vibrational response. A prior art untuned damper includes damping tiles used as broad band dampers comprising plates of a plastic damping material affixed to the surface of the structure. The dimension of the tile must be chosen in direct proportion to the thickness of the structure and therefore the tiles are applicable only to thin structures or structures which can accommodate a substantial addition of weight, which is a large fraction of the weight of the structure to be damped. Since the damping tile operates by absorbing a certain fraction of the structure's strain energy, the tiles must be located at places of high strain and can dissipate bending motions more effectively than other types of motions. Another embodiment of untuned damping mechanisms includes damping coatings comprising broad band damping treatments used on large surfaces of structures to reduce multi-frequency vibration. These coatings are not effective on the smaller, modern designs of the marine propulsion subbase.

SUMMARY OF THE INVENTION

In general, the invention features damping structural vibrations by applying a multiplicity of discrete untuned passive dampers to the structure. Each passive damper includes a damping element and a damping mass, and the damping element provides damping generally in proportion to the relative velocity occurring between the mass and a point of attachment of the damper to the structure. The damping coefficients of the damping elements are selected so that the dampers increase the effective loss factor of the structure.

In preferred embodiments the passive dampers each have a damping mass which is supported such that the dampers experience an undamped natural frequency below the resonant frequencies and the frequency range of the structure. The means for support can be a spring element having a specific stiffness coefficient chosen to render an undamped natural frequency complying with the above requirement. More than 10 (preferably more than 100) discrete dampers are applied to the structure. The discrete dampers can be connected to the structure in a random pattern, a regular pattern, or can be supported by a connecting structure which determines fixed interrelationships between dampers. The total damper mass may be less than 10% of the mass of the structure, and can be less than 5%. The damping element uses squeeze film damping, in which a film of viscous fluid is positioned so that relative movement of the structure and, therefore, the damper mass causes the viscous liquid to flow within the film producing dissipative shear stresses within the liquid.

In another aspect, the invention features an untuned passive damper of the type having a damping element and a damping mass, and in which the damping coefficient, $C_d$, of the damping element is selected such that the ratio of this coefficient to the real part of the impedance of the structure, $C_d/\text{Re}\{Z\}$, is sufficiently close to the optimal value of the ratio (i.e., the value for which the effective loss factor of the structure, $\eta_{eff}$, is at a maximum) to assure that the damping elements are effective at dissipating power from the structure. Keeping the ratio within two orders of magnitude above or below the optimal value accomplishes this.

In another aspect, the invention features selecting the damping coefficient so that at least 10% of the possible increase in damping is achieved (i.e., the increase in effective loss factor, $\eta_{eff}$, of the structure provided by the damper is at least 10% of the increase in loss factor achievable with the optimal value of the damping coefficient).

In yet another aspect, the invention features a method for selecting the damping coefficients of passive dampers for damping vibrations in a structure. The method includes three steps. First, the real part of the impedance $\text{Re}\{Z\}$ of the structure is determined (e.g., by measuring the force and velocity of the structure on multiple locations over a chosen range of frequencies and taking an average of all the measurements). The impedance can also be determined theoretically, depending on the complexity of the structure. Second, a value of the ratio, $C_d/\text{Re}\{Z\}$, for which damping will be effective is determined, either from theory or experiment (e.g., by measuring the ratio for a known structure on which the dampers are effective). The ratio may vary depending on the type of structure and the number and design of the dampers. Third, damping coefficients are determined from the impedance and ratio values (e.g., by multiplying the ratio and impedance values).

DESCRIPTION OF THE PREFERRED EMBODIMENT

Figure 1:
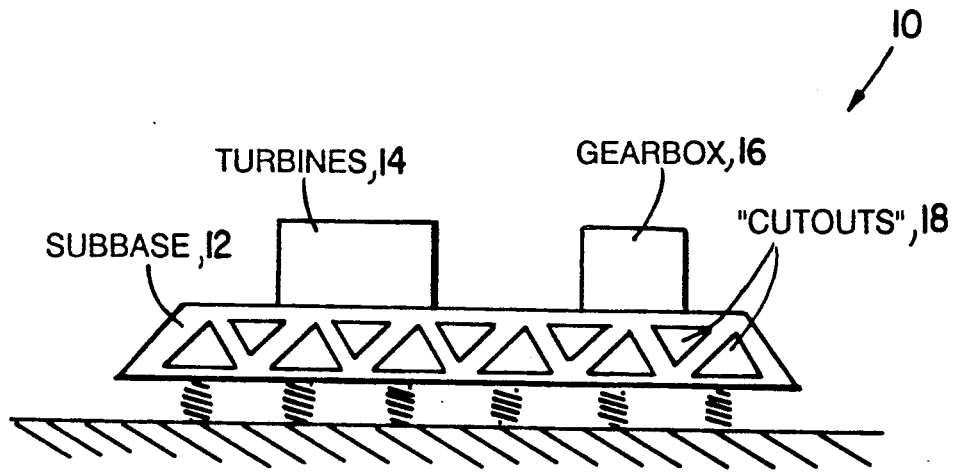
FIG. 1 is a diagrammatic illustration of a typical arrangement of marine propulsion equipment.

FIG. 1 shows the typical arrangement of marine propulsion equipment 10. It includes a subbase 12 supporting turbines 14 and a gearbox 16. The subbase 12 contains "cutouts" 18 in its structure to allow for a substantial reduction in weight, resulting in an increased vibrational response. The discrete passive damper of the invention to be discussed below attaches directly on the subbase 12 to reduce the vibration.

Figure 2:
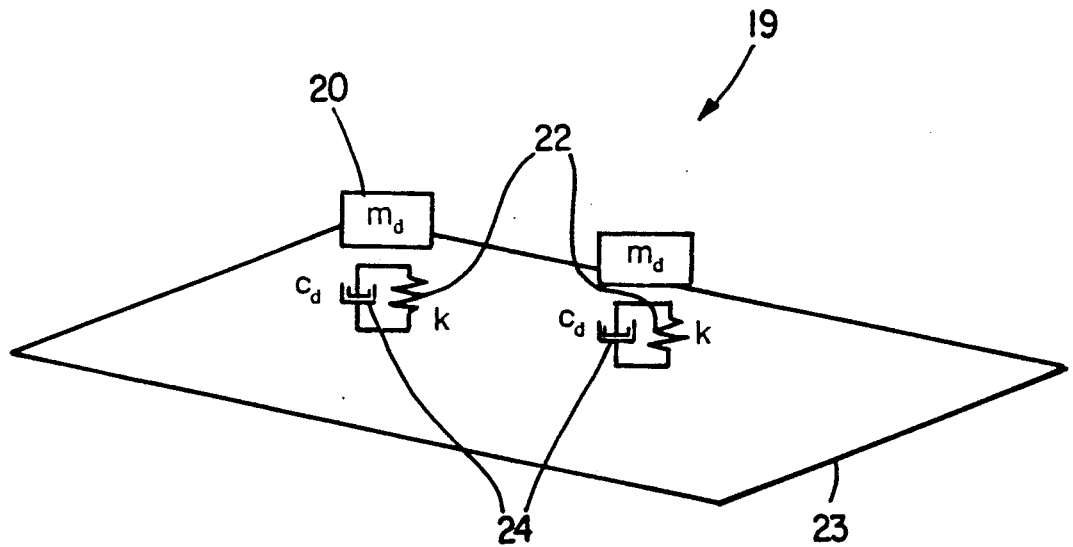
FIG. 2 is a diagrammatic representation of the discrete damper of the invention.

FIG. 2 shows a diagrammatic embodiment of the present invention. This embodiment of a discrete passive damper 19 includes a series connection of a damping mass 20 to a combination spring 22-damping element 24 working in parallel. The spring constant, k, of the spring 22 is chosen so that the resonant frequency of the damper 19 remains well below the frequency range of a structure 23 so that the spring 22 functions only as a centering or locating device for the damper 19. The damping element 24 having a damping coefficient, $C_d$, is matched to the real part of the structural impedance, $Re\{Z\}$, of the structure 23. The real part of the impedance $Re\{Z\}$ is determined by measuring the force and velocity of the structure 23, averaged over the entire vibrational range of the structure, taken at multiple locations on the structure and again averaged over all measurement locations. The real part of the impedance, therefore, is similar for similar structures. A relationship is a established wherein $C_6/Re\{Z\}$ equals a constant between 0 and 1. This constant is determined from factors including the frequency range of interest and the number of discrete dampers that can be added to the structure. It is usually determined from a computer generated plot of effective loss factor, $\eta_{eff}$, versus the ratio $C_d/Re\{,Z\}$ over the frequency range. This plot (FIG. 5) will be discussed later on in the disclosure. In general, one damping device is not as effective in improving the damping of the structure, whereas many individual devices result in significant damping improvements.

Figure 3:
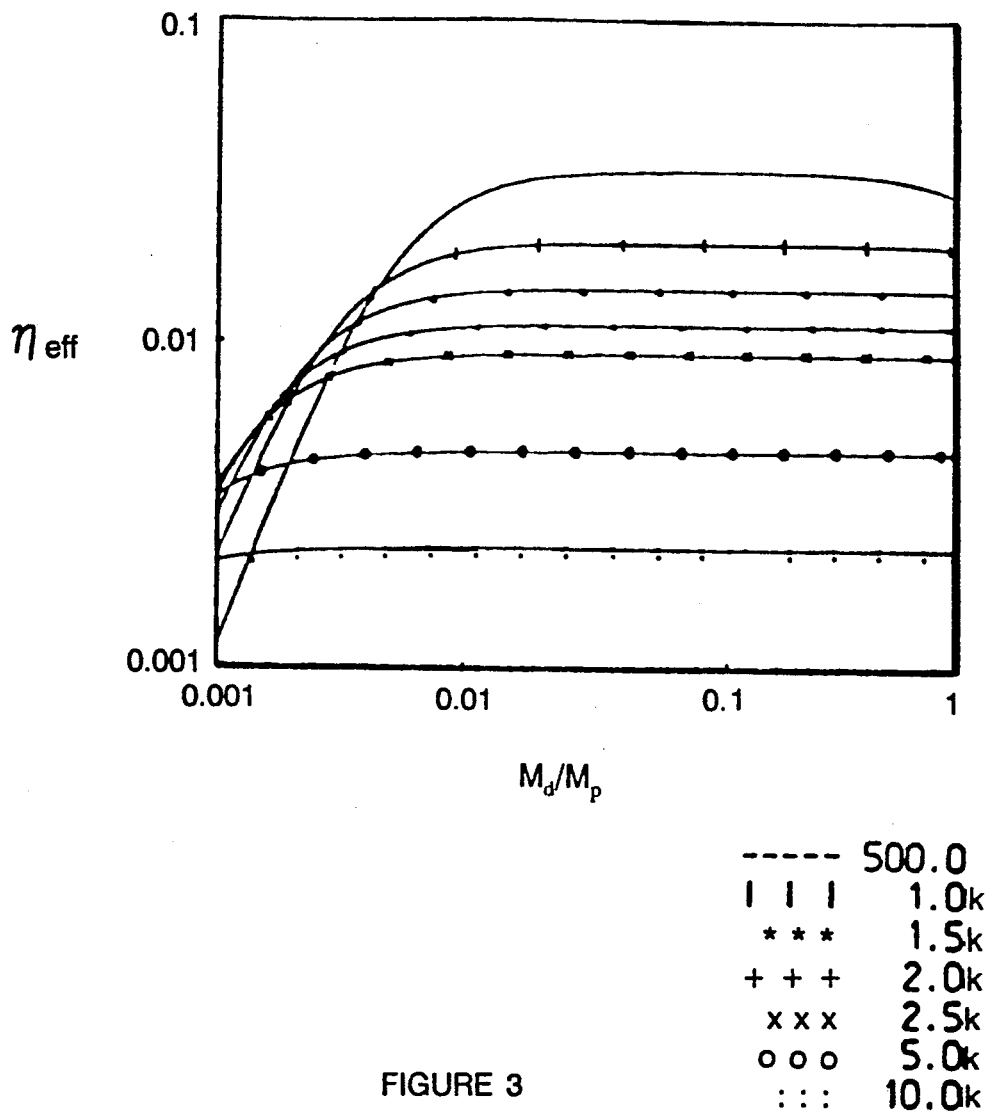
FIG. 3 is a graph of the $\eta_{eff}$ versus a ratio of the total damper mass to the total structure mass for varying frequencies.

FIG. 3 illustrates an effective loss factor, $\eta_{eff}$, versus a ratio of total damper mass to the mass of the structure over a given frequency range. From this figure, it is apparent that there is no significant benefit to having a total damper mass greater than 10% of the structure mass. Additionally, a total damper mass of only 5% of the structure mass is sufficient to effectively increase the loss factor, $\eta_{eff}$, for the case studied here. Therefore, although a plurality of discrete dampers is more effective than a damper in singular form, the number of dampers required to effectively dissipate vibrational energy in a structure contributes only a small percentage to the weight of said structure.

Figure 4A:
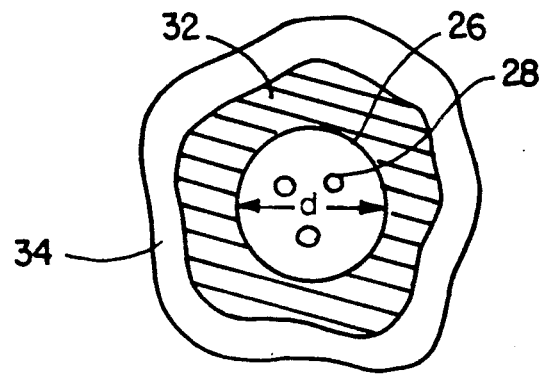
FIG. 4a is a top view of an experimental arrangement of the damper mechanism.
Figure 4B:
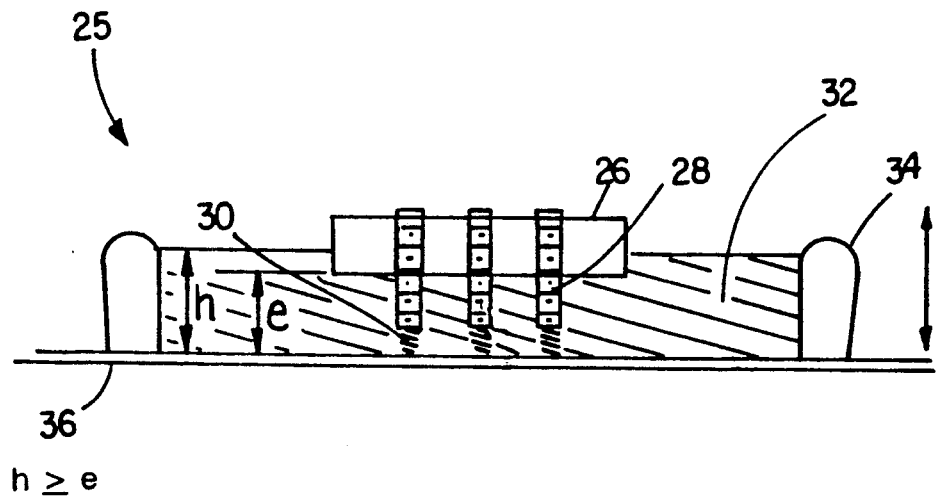
FIG. 4b is a cross-sectional view of the experimental arrangement of the damper mechanism.

With reference to FIGS. 4a and 4b, an experimental embodiment 25 comprises a damping mass 26 connected by set screws 28 to polyurethane "feet" 30 acting as springs. The complete setup 25 is partially submerged in a pool of glycerine 32 of a variable depth (film thickness) controlled by the set screws 28. The glycerine 32 is contained by a containment wall 34 made of silicone. The film thickness of the glycerine 32 controls the damping coefficient, $C_d$. The viscous fluid, glycerine 32, is used in conjunction with the surface area of the damping mass 26 to act as a squeeze film damper. Squeeze film damping works on the following principle. As the plate 36 vibrates in the vertical direction indicated in FIG. 4b, the film thickness, e, varies. The damping mass 26 diameter, d, is much greater than the nominal film thickness, e. Therefore, if the fluid can be considered incompressible, as is the case here, a small variation in the film thickness, e, results in a high outflow velocity of the fluid between the damping mass 26 and the plate 36 in a direction parallel to the plate surface. The shear losses occurring in the high velocity outflow of fluid as it is "squeezed" between the damping mass 26 and the plate 36 dissipate energy and provide damping.

An important aspect of the invention is selecting a damping coefficient, $C_d$, such that it matches the average real part of the impedance of the above mentioned structure. A numerical analysis program which was based on SEA (Statistical Energy Analysis) principles was used to determine the theoretical optimal $C_d$. By inputting factors such as the frequency range of interest and the number of dampers to be employed, SEA can calculate the effective loss factor, $\eta_{eff}$, for varying values of the ratio $C_d/Re\{Z\}$ (see FIG. 5). An optimal value for this ratio is chosen to be the corresponding ratio value for the maximum $\eta_{eff}$. The real part of the impedance can be determined experimentally or analytically (as discussed above). Therefore, the $C_d$ is calculated from the known quantities of optimal value of this ratio and real part of the impedance.

Figure 5:
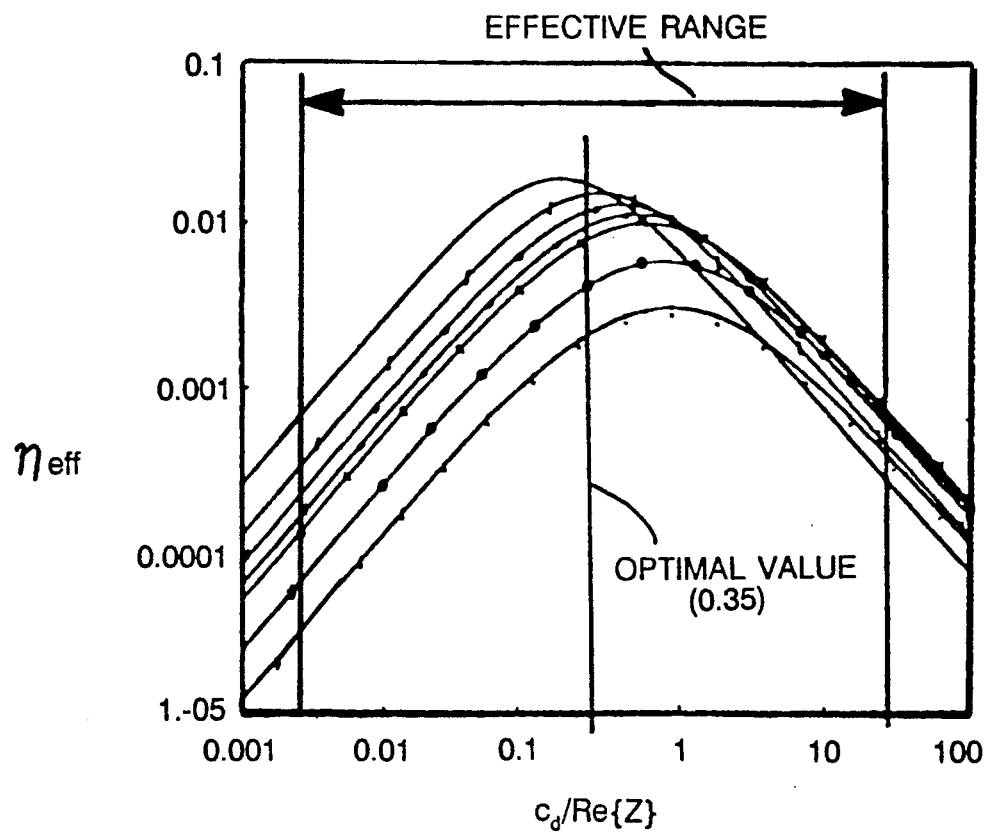
FIG. 5 is a graph of the $\eta_{eff}$ versus the ratio $C_d/\text{Re}\{Z\}$ for varying frequencies.

FIG. 5 demonstrates an example of effective loss factor, $\eta_{eff}$, for varying $C_6/Re\{Z\}$ ratios over a frequency range of 500 to 10,000 hertz. The system analyzed comprised a structure of ⅛" aluminum plate having a mass of 4.0 kilograms and 10 discrete passive dampers having damping masses of 20 grams each. The effective loss factors were determined. For this example, the optimal value for $C_d/Re\{Z\}$ was found to be approximately 0.35. The most effective damping coefficients for this structure, $C_d$, would then fall into the range two orders of magnitude above and below the optimal value, namely 0.0035 to 35.

Figure 6:
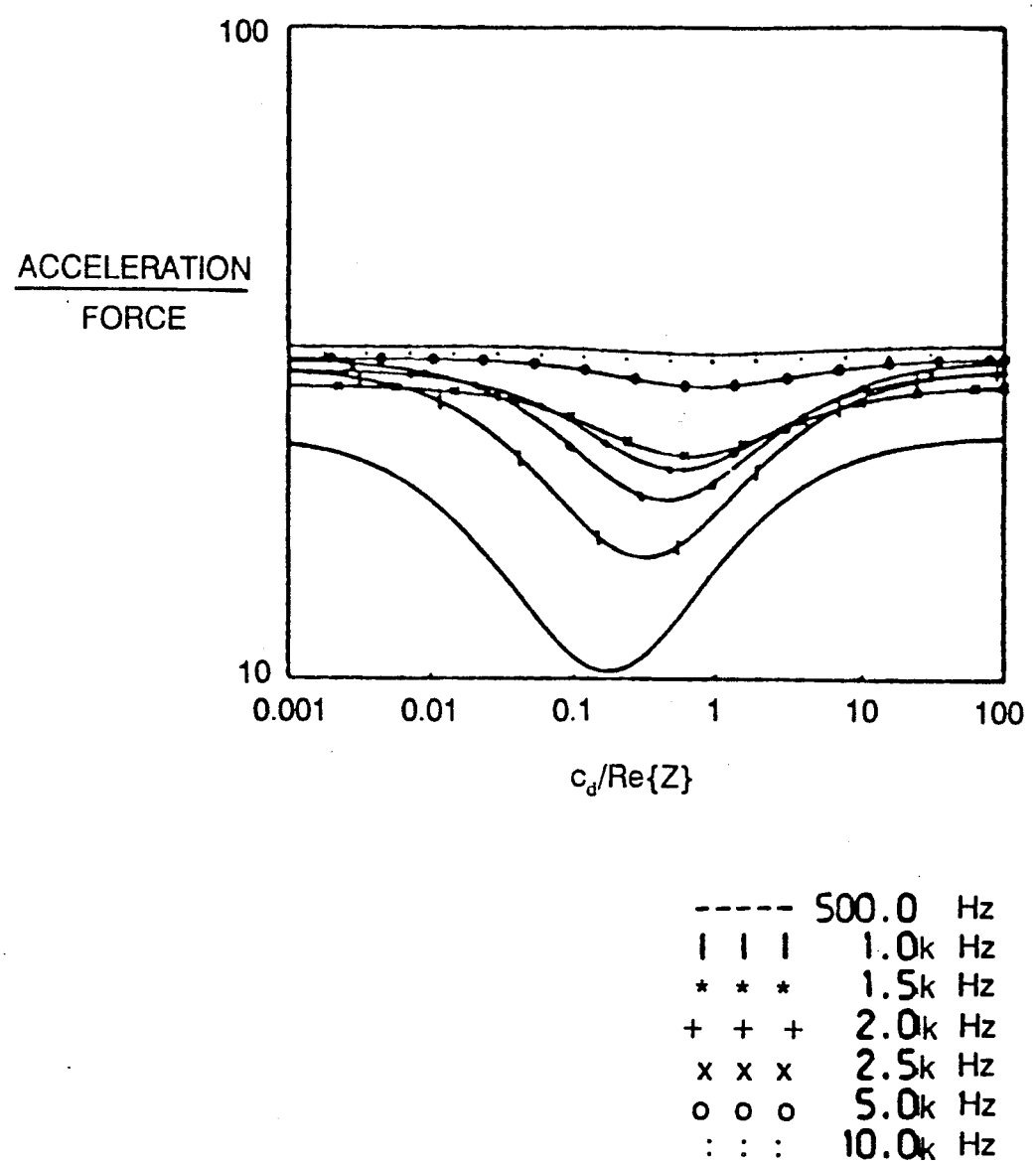
FIG. 6 is a graph of the transfer acceleration/force function versus $C_d/\text{Re}\{Z\}$ for varying frequencies, from analytical methods.

FIG. 6 illustrates the transfer function of the system described above versus the ratio $C_6/Re\{Z\}$. The transfer function compares the output acceleration to the input force on the structure. At lower frequencies of operation, the transfer function responded dramatically to the change in damping coefficient, decreasing drastically when the ratio $C_d/Re\{Z\}$ approximately equaled 0.1 and rendering a broad band response. Conversely, at higher frequencies the transfer function was increasingly less effected by a change in the damping coefficient. As the frequency was increased to 10,000 hertz, there was no observable change in the transfer function. In conclusion, the results demonstrate excellent broad band damping ability on structures at frequencies less than 2,500 hertz.

Figure 7:
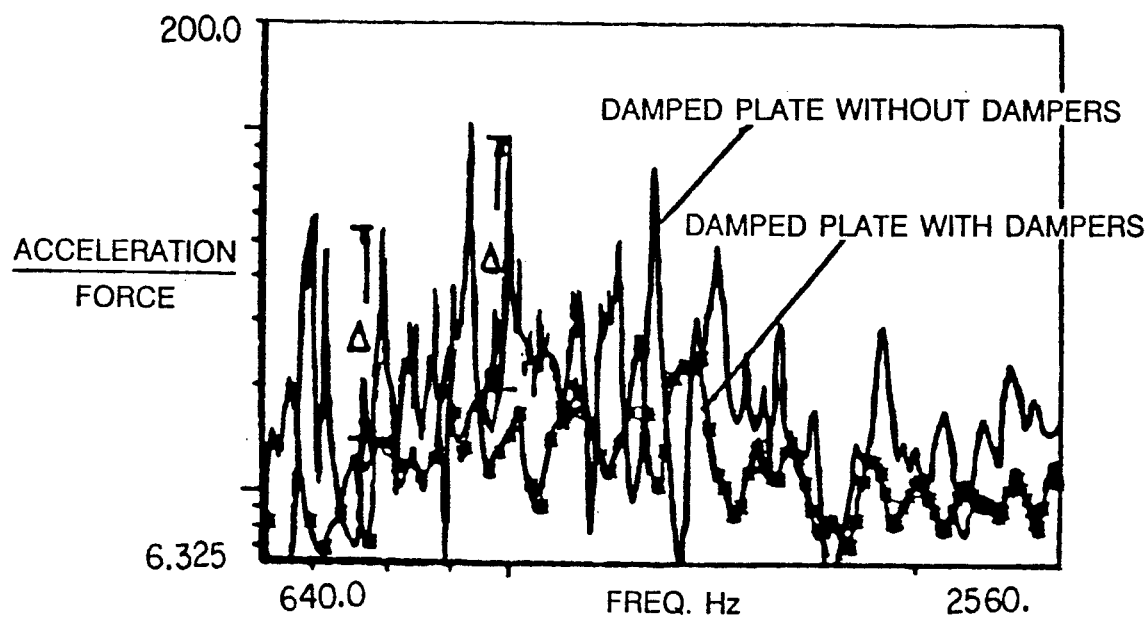
FIG. 7 is a graph of the acceleration/force transfer function versus frequency for an aluminum plate with dampers and without dampers, derived from experimental methods.

Several experiments were performed at the Massachusetts Institute of Technology to verify the analytical results. The $C_d$ of the squeeze film damper operating between the fluid and the mass was measured using a shaker table (not shown) and an impedance head (not shown). The effective loss factor of the aluminum plate treated with damping tape was measured using the integrated impulse technique with varying numbers of discrete dampers and damping coefficients. The results of these data are shown in Table 1. These data demonstrate a significant improvement in the plate loss factor over a broad frequency range when 35 discrete passive dampers are utilized. From FIG. 7, a graph of the experimentally determined average acceleration output/force input transfer function for the plate with and without 35 discrete passive dampers is disclosed wherein is evidenced as much as a 15dB decrease in peaks of the transfer function resulting from the squeeze film damping due to the 35 discrete dampers.

TABLE 1

Average Measured Effective Loss Factor for the Configurations Tested
Average $\eta_{meas}$ as a function of frequency

| m | $C_d$ | $C_d/Re\{Z_p\}$ | $M_d$ | $mM_d/M_p$ | 320 Hz | 960 Hz | 1600 Hz | 2240 hz |
|---|---|---|---|---|---|---|---|---|
| 10 | N/A | N/A | N/A | N/a | .0066 | .0044 | .0069 | .0084 |
| 35 | N/A | N/A | N/A | N/A | .0065 | .0056 | .0085 | .0215 |
| 10 | 103 | .32 | 20 gm | .05 | .0092 | .014 | .012 | .011 |
| 25 | 103 | .32 | 20 gm | .012 | .012 | .016 | .024 | .026 |
| 35 | 103 | .32 | 20 gm | .018 | .015 | .019 | .025 | .035 |
| 35 | 68 | .21 | 20 gm | .018 | .021 | .025 | .026 | .029 |
| 35 | 300 | .94 | 20 gm | .018 | .016 | .014 | .019 | .028 | where m = number of individual discrete dampers
$C_d$ = damping coefficient
Re(z) = real part of impedance
$M_d$ = individual damper mass
$M_p$ = mass of plate
$\eta_{eff}$ = effective loss factor Additional embodiments include a discrete "puck" and an interconnected array of dampers.

Figure 8:
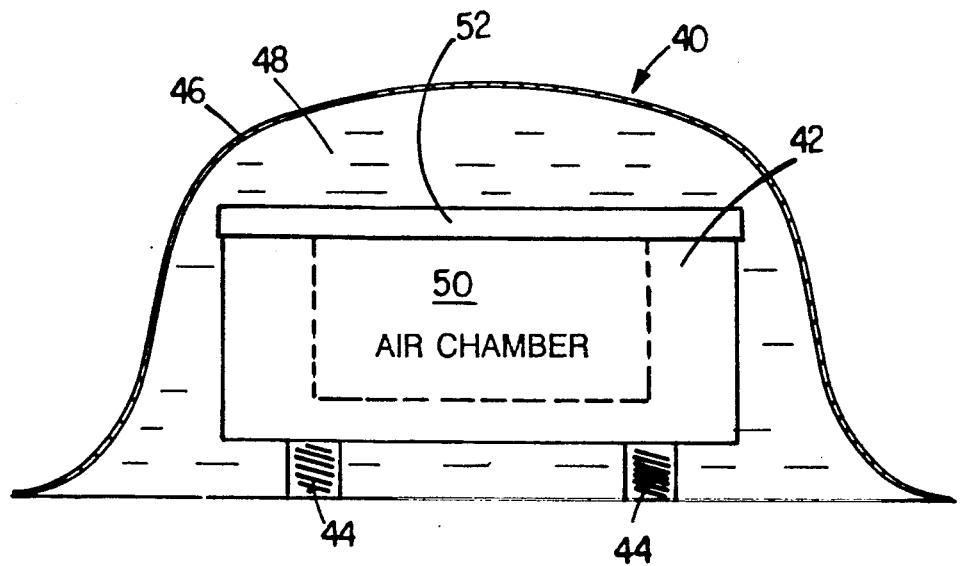
FIG. 8 is a cross-sectional view of an embodiment of the invention.

The "puck" embodiment 40 in FIG. 8 includes one discrete passive damper comprising a damping mass 42 in series connection with a spring-damping element combination operating in parallel. Soft springs 44 serve to center the mass 42. The damper is encased within a plastic casing 46. The means of damping include a viscous fluid 48, such as glycerine, comprising a film contained within the casing 46, interacting with the mass to create dissipative shear stresses. This technique is known as squeeze film damping. An air chamber 50 and breathing orifices 52 are provided for volume control. The film thickness of the glycerine determines the damping coefficient, $C_d$, which is impedance matched to the structure using the real part of the structural impedance as described earlier. The number and distribution of the individual "pucks" on a structural surface are determined from factors such as mass of the structure, surface area of the structure, and frequency range over which the damping devices have a maximum effect.

Squeeze film damping mass may also be provided in three directions (x, y, z) using a "puck" type damper in which movement of the mass in each of the directions produces damping forces.

Figure 9:
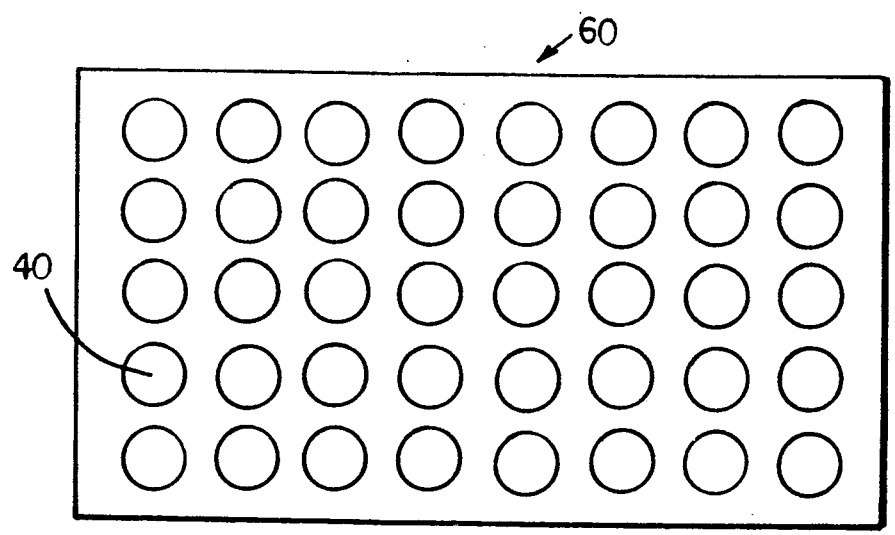
FIG. 9 is a plan view of another embodiment of the invention.

An interconnected array of dampers, embodiment 60 (FIG. 9), utilizes a plurality of the above mentioned discrete dampers in a predetermined arrangement supported by a connecting structure and determining number and spacing of the dampers. As will be appreciated by those skilled in the art, this embodiment will be affixed to the surface of a structure to be damped.

Other embodiments are within the following claims.

For example, damping means could be provided by utilizing magnetic or electrical fields. Additionally, there are many structural and functional modifications that can be made within the scope of the invention.

What is claimed is:

1. Apparatus for damping vibrations in a structure, said vibrations occurring at resonant frequencies across a frequency range, said structure having an effective loss factor ($\eta_{eff}$) said apparatus comprising:

a multiplicity of discrete passive dampers connected to said structure, each said passive damper comprising a damping element and a damping mass, each said damping element having a damping coefficient and providing damping forces generally in proportion to a relative velocity occurring between said damping mass and a point of attachment of said damper to said structure, each said damping mass being supported so that each said damper has an undamped natural frequency, below all of said resonant frequencies in said frequency range, and so that said passive dampers are all untuned to said resonant frequencies, and the damping coefficients of said damping elements being selected so that said dampers increase the effective loss factor of said structure.

2. The apparatus of claim 1 wherein said damper mass is supported from said structure by said damping element and a spring element, and the undamped natural frequency of said damper mass and spring element is set to be lower than said resonant frequencies in said frequency range.

3. The apparatus of claim 1 wherein there are 10 or more said discrete passive dampers connected to said structure.

4. The apparatus of claim 3 wherein there are 100 or more said discrete passive dampers connected to said structure.

5. The apparatus of claim 1 wherein said discrete passive dampers are connected to said structure in a random pattern.

6. The apparatus of claim 1 wherein said discrete passive dampers are connected to said structure in a regular pattern.

7. The apparatus of claim 1 wherein the discrete passive dampers are supported by a connecting structure determining a fixed pattern of damper interrelation.

8. Apparatus for damping vibrations in a structure, said vibrations occurring at resonant frequencies across a frequency range, said structure having an effective loss factor ($\eta_{eff}$) and said structure having a real part of an impedance (Re{Z}) said apparatus comprising:

at least one passive damper connected to said structure, said passive damper comprising a damping element and a damping mass, each said damping mass being supported so that each said damper has an undamped natural frequency below all of said resonant frequencies across a frequency range, so that said passive dampers are all untuned to said resonant frequencies, each said passive damper having a damping coefficient ($C_d$) and said damping coefficient ($C_d$) of said damping element being selected so that a ratio of said coefficient to the real part of the impedance of said structure ($C_d/\text{Re}\{Z\}$) is within two orders of magnitude above or below an optimal value of said ratio, said optimal value being the ratio for which the effective loss factor of said structure ($\eta_{\text{eff}}$) is at a maximum.

9. Apparatus for damping vibrations in a structure, said vibrations occurring at resonant frequencies across a frequency range, said structure having an effective loss factor ($\eta_{\text{eff}}$) said apparatus comprising:

at least one passive damper connected to said structure, said passive damper comprising a damping element and a damping mass, each of said damping mass being supported so that each said damper has an undamped natural frequency below all of said resonant frequencies across a frequency range, so that said passive dampers are all untuned to said resonant frequencies, each said passive damper having a damping coefficient ($C_d$) and said damping coefficient ($C_d$) of said damping element being selected such that the increase in the effective loss factor ($\eta_{\text{eff}}$) of said structure contributed by said passive damper is at least 10% of the increase in loss factor for an optimal value of the damping coefficient, said optimal value being the damping coefficient for which the effective loss factor of said structure is at a maximum.

10. The apparatus of claim 8 or claim 9 wherein there are a multiplicity of said passive dampers.

11. The apparatus of claim 10 wherein there are 10 or more said passive dampers.

12. The apparatus of claim 1, 8 or 9 wherein said damper mass is 10% or less of the mass of said structure.

13. The apparatus of claim 12 wherein said damper mass is 5% or less of the mass of said structure.

14. The apparatus of claim 1, 8 or 9 wherein said damping element comprises a squeeze film damping mechanism.

15. The apparatus of claim 14 wherein said squeeze film damping mechanism comprises a film of viscous liquid positioned so that relative movement of said structure and said damper mass causes said viscous liquid to flow within said film and thereby produce dissipative shear stresses in the liquid.

16. The apparatus of claim 15 wherein said passive damper comprises a housing containing a pool of said viscous liquid and said damper mass is positioned in said pool of liquid so as to form said film between a surface of said damper mass and a wall of said housing.

* * * * *

UNITED STATES PATENT AND TRADEMARK OFFICE
CERTIFICATE OF CORRECTION

PATENT NO.  : 5,127,498

DATED       : 7/7/92

INVENTOR(S) : Richard H. Lyon and Craig Gardner

It is certified that error appears in the above-identified patent and that said Letters Patent is hereby corrected as shown below:

Cover page, in the title, [54] "MATCHES" should be --MATCHED--.

Col. 1, line 1, in the title, "MATCHES" should be --MATCHED--.

Col. 4, line 28, "$C_6/Re\{Z\}$" should be --$C_d/Re\{Z\}$--.

Col. 4, line 40, "$C_6/Re\{Z\}$" should be --$C_d/Re\{Z\}$--.

Col. 7, line 17, delete "of" after --each--.

Signed and Sealed this

Tenth Day of August, 1993

Attest:

MICHAEL K. KIRK

*Attesting Officer*     *Acting Commissioner of Patents and Trademarks*